United States Patent [19]
Clark et al.

[11] Patent Number: 5,356,580
[45] Date of Patent: Oct. 18, 1994

[54] METHOD OF USING A VENTED MOLD

[75] Inventors: Leslie E. Clark, Maple; Craig A. Hunter, Milton; Robert B. Magee, Caledon East; Gerry V Wetering, Georgetown; Wilfred W. T. Cheng, Oakville, all of Canada

[73] Assignee: Woodbridge Foam Corp., Mississauga, Canada

[21] Appl. No.: 939,704

[22] Filed: Sep. 2, 1992

[51] Int. Cl.$^5$ ............................................. B29C 67/22
[52] U.S. Cl. ..................................... 264/51; 264/276; 264/296; 425/812
[58] Field of Search .................... 264/51, 46.4, 40.3, 264/276, 46.6, 296; 425/812

[56] References Cited

U.S. PATENT DOCUMENTS

| | | | |
|---|---|---|---|
| 2,700,178 | 1/1955 | Blake | 425/812 |
| 3,431,331 | 3/1969 | Pincus et al. | 264/46.6 |
| 3,822,857 | 7/1974 | Tanie | 249/141 |
| 4,191,722 | 3/1980 | Gould | 264/45.5 |
| 4,333,899 | 6/1982 | Hogan et al. | 425/812 |
| 4,437,257 | 3/1984 | Kluge | 425/812 |
| 4,923,653 | 5/1990 | Matsuura et al. | 264/40.3 |
| 4,959,184 | 9/1990 | Akai et al. | 264/46.4 |
| 4,976,414 | 12/1990 | Yanagishta | 264/46.4 |
| 5,039,291 | 8/1991 | Iwasawa et al. | 425/812 |
| 5,110,085 | 5/1992 | Iwasawa | 425/812 |

FOREIGN PATENT DOCUMENTS

| | | | |
|---|---|---|---|
| 866091 | 2/1953 | Fed. Rep. of Germany. | |
| 2246948 | 4/1974 | Fed. Rep. of Germany | B29D 27/00 |
| 2540884 | 3/1977 | Fed. Rep. of Germany | B29F 1/022 |
| 2939314 | 4/1981 | Fed. Rep. of Germany | B29D 27/00 |
| 223397 | 6/1985 | Fed. Rep. of Germany | 425/812 |
| 62-238713 | 10/1987 | Japan | 425/812 |

*Primary Examiner*—Allan R. Kuhns
*Attorney, Agent, or Firm*—Fitzpatrick, Cella, Harper & Scinto

[57] ABSTRACT

A novel method of molding an article includes providing a mold with a vent of a pre-determined size such that, due to the difference in viscosities, gases to be vented from the mold may easily pass through the vent while the material to be molded cannot quickly pass through the vent. In fact, the vent is designed such that the material to be molded which enters the vent, does not exit the end of the vent. In the most preferred embodiment, the vent is in the form of a thin ribbon-like groove so that the material to be molded which does enter the vent forms a thin ribbon of extruded material which need not be removed prior to a finish cover being applied to the molded article.

28 Claims, 7 Drawing Sheets

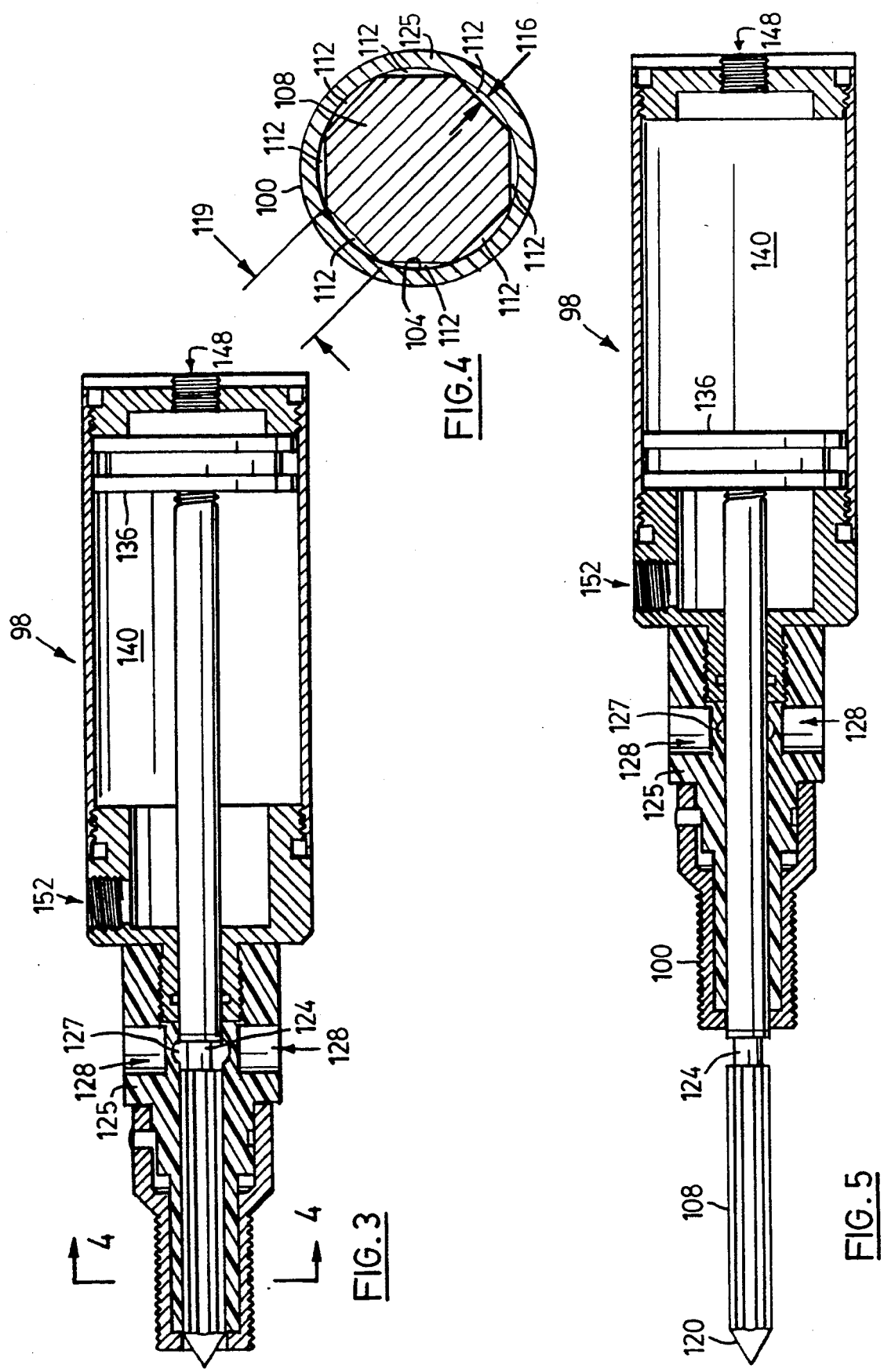

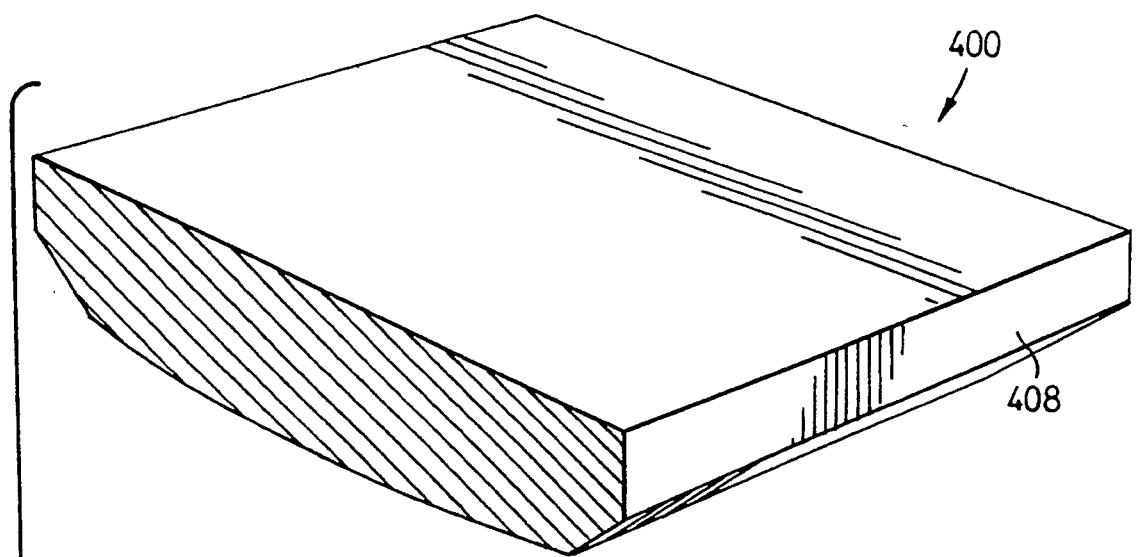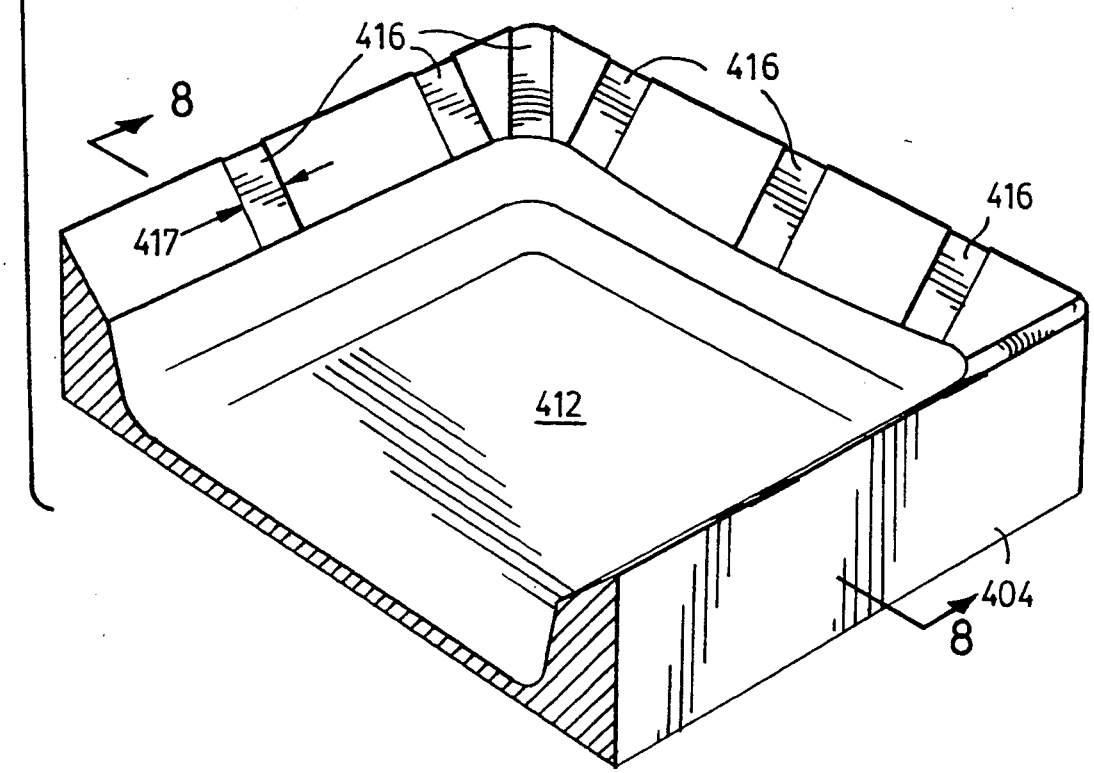

METHOD OF USING A VENTED MOLD

BACKGROUND OF THE INVENTION

1. Field of the Invention

The present invention relates to a novel mold for producing foamed articles. Specifically, an aspect of the present invention relates to an improved mold including a vent capable of providing necessary venting of the mold while minimizing extrusion of raw material into the vent, thus reducing wastage. In its most preferred embodiment, the present invention also eliminates the requirement to remove the extruded raw material from the molded article prior to application of a finish (e.g. trim) cover.

The present invention also relates to a novel method of molding articles which reduces wastage resulting from raw material being extruded into the vent during venting of the mold. In its most preferred embodiment, the method reduces or eliminates the requirement to remove the extruded material prior to application of a finish cover.

2. Description of the Prior Art

Many articles are manufactured by placing a raw material into a cavity in a mold wherein the raw material undergoes a physical change (e.g. it expands or foams) and the article produced thus acquires the shape of the cavity. In particular, this technique is commonly employed for producing foamed articles made from polymeric foams such as polyurethane foam, latex (e.g. natural and styrene-butadiene rubber) foam and the like.

For example, automotive seats are commonly manufactured from polyurethane cushions which are molded to shape and then covered with a vinyl, cloth or leather finish cover. Polyurethane foams are somewhat unique in that foaming and at least a portion of the polymerization process occur simultaneously. Thus, in the production of polyurethane foam using, for example, a conventional cold foam technique, a typical formulation comprises:
1. Polyol
2. Water
3. Tetramethyl ethane diamine
4. Dimethyl ethanol amine
5. Polyisocyanate The mixture is dispensed into a mold using a suitable mixing head, after which the mold is then closed to permit the expanding mass within it to be molded. Accordingly, it is convenient generally to refer to the mixture initially dispensed into the mold as "a liquid foamable polymeric composition" or, in this case, "a liquid foamable polyurethane composition". As the composition expands in the mold, polymerization occurs and the polymer so formed becomes solidified.

When molding a liquid foamable polymeric composition to form articles such as polyurethane foam articles, it is conventional to use a clam-shell mold comprising a bottom mold and a top mold which, when closed, define a mold cavity. The mold is opened, the liquid foamable polyurethane composition is dispensed into the mold cavity and the mold is closed as a chemical reaction causes the composition to expand. After the mold is closed, the composition expands to fill the interior cavity of the mold. Alternatively, the composition may be dispersed into a closed mold. In either case, as the polymerization reaction is completed, the foam cures and permanently assumes the shape of the mold cavity.

As is known to those of skill in the art, it is essential during this process that the mold be adequately vented to allow the air present in the mold to exit the mold as the foamable composition expands. Further, it is essential to allow a portion of the gases (typically $CO_2$ in the production of polyurethane) generated during polymerization to exit the mold.

Failure to adequately vent the mold results in defective molded articles exhibiting symptoms of improper foaming such as surface hardening (or foam densification) and/or void formation in the finished article due to trapped gas or air bubbles. At the other extreme, excess venting of the mold will also result in defective molded articles due to collapse of the foam prior to curing; this phenomenon is often referred to as the 'soufflé' effect. Thus, proper venting of molds is an important factor in producing acceptable molded articles.

Typically clam-shell molds are designed with drilled or cut passages in the top mold to provide vents. Locating, sizing and deciding upon the number of these vents is a matter of some skill on the part of mold designer and the production engineers, and is often an iterative procedure with more vents being added to various locations or other vents being blocked-off after test runs have been made.

During molding operations some liquid foamable polymeric composition which moves into the vent is wasted. It is generally desired to minimize the amount of wasted material (also known as "flash", "mushrooms", "buds", "pancakes" and the like) for two masons, namely (1) the wasted material adds to the overall expense of producing the finished article, and (2) the wasted material must be removed from the molded article prior to the finish cover being applied, thereby necessitating additional labour and the costs associated therewith.

Accordingly, mold designers and production engineers are continually striving to optimize the compromise between providing enough venting at the proper locations while avoiding excess venting and minimizing material wastage during venting.

SUMMARY OF THE INVENTION

It is an object of the present invention to provide a novel method of producing a molded article which obviates or mitigates material wastage during venting.

It is another object of the present invention to provide a novel mold which obviates or mitigates at least some of the above-mentioned problems with prior art.

It is yet another object of the present invention to provide a novel method of producing a molded article from which vent-extruded material need not be removed.

According to a first aspect of the present invention, there is provided a method of producing an article in a mold comprising an upper mold and a lower mold defining a mold cavity, the process comprising the steps of:

dispensing a liquid foamable polymeric composition into the mold cavity;

allowing the liquid foamable polymeric composition to expand to substantially fill the mold cavity; and venting gases in the mold cavity through at least one vent in the mold to allow the gases to exit from the mold, the size of each vent being selected such that movement of the liquid foamable polymeric composition into the vent is restricted to substantially prevent exit thereof from the vent.

Preferably, the at least one vent is located at the part-line of the mold and comprises a thickness in the range from about 0.002 inches to 0.030 inches, more preferably in the range from about 0.005 inches to about 0.020 inches. Also preferably, the at least one vent is rectangular in cross-section and the polymeric material which enters the vent forms a ribbon of material on said article which need not be removed when a finish cover is applied to said article.

According to a second aspect of the present invention, there is provided a mold for producing foamed articles, the mold comprising:

an upper mold and a lower mold which define a mold cavity; and at least one vent in communication with the mold cavity, the size of each vent being selected to allow relatively free flow of gases therethrough and to restrict movement of a liquid foam polymeric composition therethrough.

Preferably, the vent includes first and second vents, the first vent being located at the part-line between the top and bottom molds. In this embodiment, it is preferred that the first vent comprises a thickness of from about 0.002 inches to about 0.030 inches, more preferably from about 0.005 inches to about 0.020 inches. It is preferred that the second vent is located in the upper mold and comprises a thickness of from about 0.002 inches to about 0.015 inches, more preferably from about 0.003 inches to about 0.010 inches.

BRIEF DESCRIPTION OF THE DRAWINGS

Embodiments of the present invention will be described with reference to the accompanying drawings, in which:

FIG. 3 illustrates a cross-section of a vent assembly;

FIG. 4 illustrates a partial section taken along line 4—4 in FIG. 3;

FIG. 5 illustrates the vent assembly of FIG. 3 in a cleaning position;

FIG. 7 illustrates a perspective view of another clam-shell mold;

DETAILED DESCRIPTION OF THE PREFERRED EMBODIMENTS

Figure 1:
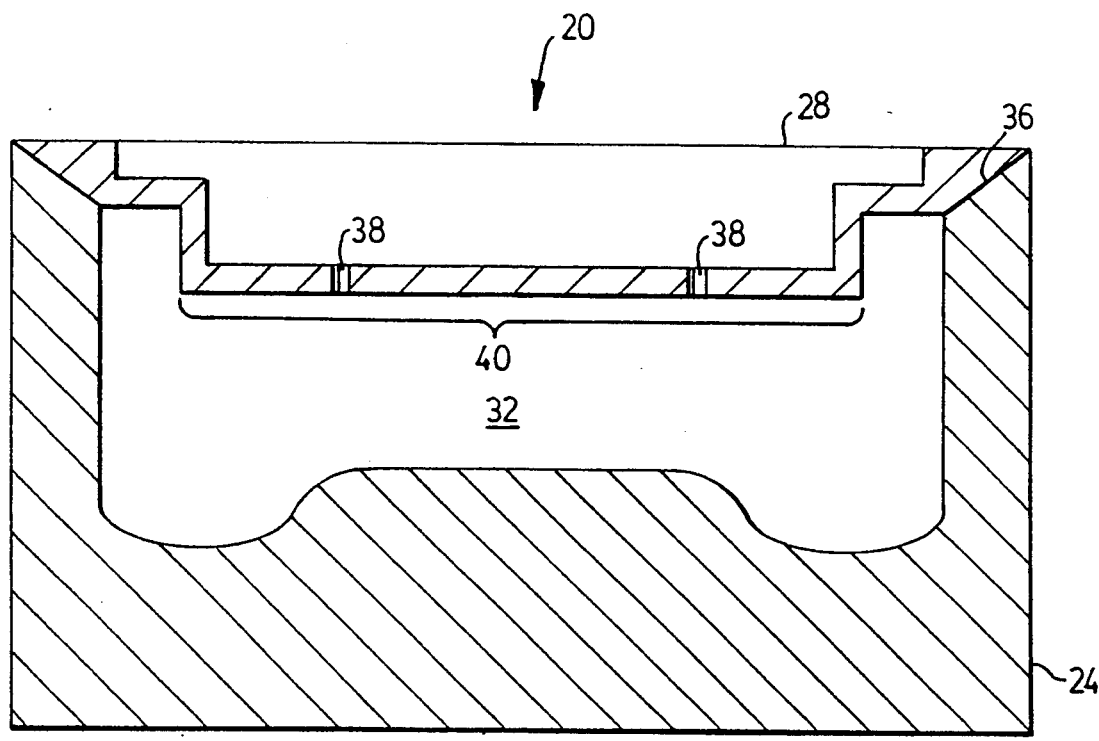
FIG. 1 illustrates a cross-section of a prior art clam-shell mold.

The most preferred liquid foamable polymeric composition is based upon polyurethane. However, it will be apparent to those of skill in the art that the present invention is applicable to other types of molding operations including, but not limited to, latex foam, neoprene foam, PVC foams and the like.

A prior art mold will first be discussed, with reference to FIGS. 1 and 2. A typical clam-shell mold, similar to those used for forming an automotive seat cushion from polyurethane foam, is indicated generally at 20 in FIG. 1. The mold includes a lower mold 24 and an upper mold 28 which are joined by a conventional hinge means (not shown). Lower mold 24 and upper mold 28, when closed, define a cavity 32 which corresponds to the shape of the automotive seat cushion.

In use, upper mold 28 is released from lower mold 24 and a predetermined amount of liquid foamable polyurethane composition is dispensed into lower mold 24. Upper mold 28 and lower mold 24 are then sealingly engaged and the liquid foamable polyurethane composition expands, displacing the air within cavity 32. This displaced air exits cavity 32 through a part-line 36 and through one or more vent passages 38 in upper mold 28. Further, as the polyurethane composition expands, polymerization occurs along with the evolution of gaseous $CO_2$ in cavity 32. This gaseous $CO_2$ may also exit cavity 32 through pan-line 36 and through vent passages 38. As is well known to those of skill in the art (and beyond the scope of this discussion), the liquid foamable polymeric composition eventually completely polymerizes and cures, acquiring the shape of cavity 32.

As is also known to those of skill in the art, the amount of liquid foamable polyurethane composition dispensed in cavity 32 must be selected to ensure that cavity 32 will be substantially completely filled, in order to avoid the occurrence of voids and other foaming defects in the molded article. While the determination of the proper amount of liquid foamable polyurethane composition for a particular mold may generally be calculated, as explained below it has heretofore been required to dispense an excess amount of polymeric composition into the mold to compensate for material which moves through and exits pan-line 36 and vent passages 38. This excess, while assisting in ensuring that cavity 32 is filled to avoid the occurrence of voids and other foaming defects in the molded articles, is in fact simply a wastage of valuable raw material.

In prior art molds, during the molding operation, air and the reaction gases produced from the expanding composition exit from cavity 32 through part-line 36 and vent passages 38 until the foam reaches the level of their respective entrances.

At this point, any further expansion of the foam results in movement of the foam into the part-line 36 and/or vent passages 38. In the simplest case of a cavity without irregularities, the foam reaches the level of the part-line and/or the vent passages at approximately the same time, which usually occurs at or near the maximum expansion point of the foam. Thus, provided that the proper amount of liquid foamable polyurethane composition has been dispensed into the cavity, only a small amount of foam enters the partline and/or the vent passages as cavity 32 is completely filled.

In practice, however, as shown in FIG. 1, most molds include irregularities in their cavities for various features required on the molded article. In such a case, the thickness and shape of mold cavity 32 typically varies across the cavity and the entrance to part-line 36 and vent passages 38 in the mold may thus be located at different heights depending upon where they communicate with cavity 32. Further, localized areas of high and low pressure also occur within cavity 32 due to the manner in which the foam and the gases produced collect in and move between the irregularities therein and thus the level of foam in different parts of cavity 32 at different times may vary.

Due to the above-mentioned factors, the foam in the cavity typically reaches the level of the part-line and/or different vent passages at different times while the foam is still expanding. For example, in a region wherein the top of cavity 32 is lower than surrounding regions, such as indicated at 40 in FIG. 1, the foam may quickly reach the vent passages 38. As the foam is still rising in the rest of cavity 32 and has not yet cured, a relatively significant amount of foam may enter vent passages 38 in this region.

Again, as the amount of foam which enters the part-line 36 and vent passages 38 reduces the amount of foam remaining in cavity 32 by a like amount, it is necessary that the amount of liquid foamable polyurethane composition placed in cavity 32 include an amount in excess of that required to fill cavity 32 to offset the foam which entered the part-line and vents. This excess amount, while necessary for proper operation of the prior art mold, is essentially wasted material and adds to the cost of forming the article.

Figure 2:
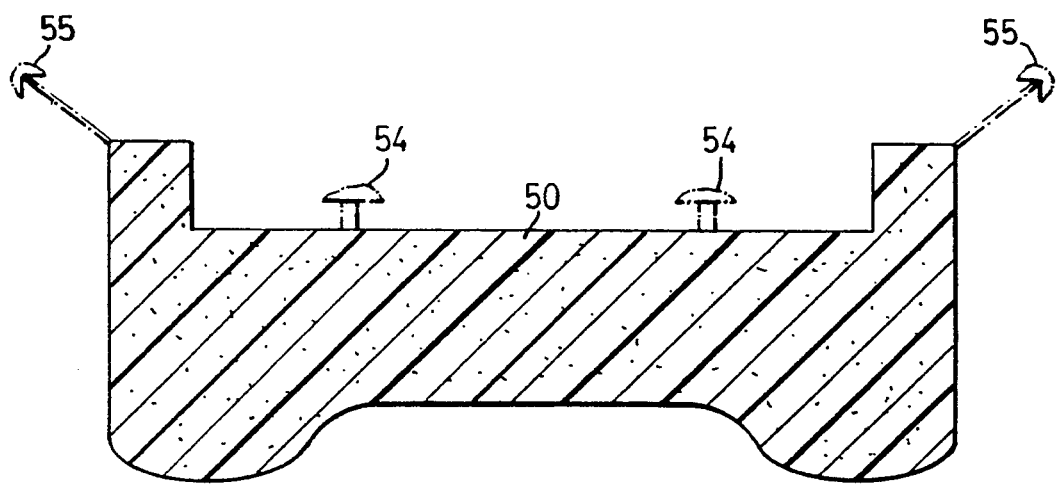
FIG. 2 illustrates a sectional view of an article produced in the prior art mold of FIG. 1.

Further, as shown in FIG. 2, the foam which enters vents 38 forms 'mushrooms' 54 (shown in ghosted line) of wasted material on the molded article 50. Further, the material which enters part-line 36 forms 'pancakes' 55 of wasted material on the moulded article 50. Typically, mushrooms 54 and pancakes 55 must be disconnected from article 50 and removed from the mold 20 prior to application of a finish cover to ensure a finished covered article which is of acceptable appearance and texture, and to prepare mold 20 for re-use. The necessity of removing mushrooms 54 and pancakes 55 results in an increased labour cost associated with manufacturing the molded product.

In addition to the excess liquid foamable polyurethane composition which is added to offset the material extruded into the vents, excess liquid foamable polyurethane composition is also added to compensate for process variations due to changes in temperature, humidity, ambient pressure and minor changes in the composition of the liquid foamable polyurethane composition. Accordingly, in prior art molds, the wastage of material exiting the vents is inevitable.

Embodiments of the present invention will now be described, with reference to FIG. 3 through 10.

The present inventors have determined that it is possible to use the difference in the physical characteristics of the expanding liquid foamable polymeric composition, prior to curing thereof, and the vented gases to design vents which minimize the amount of material which is extruded into the vent passages as wasted material. Specifically, it has been determined that vents may be designed with sizes which provide much different flow rates depending on the viscosity of the fluid flowing therethrough. Thus, gases, which possess a relatively low viscosity, flow relatively easily and quickly through the vent. In contrast, the liquid foamable polymeric composition, which possesses a relatively high viscosity (especially when it reaches the vent as expansion and curing are near completion), flows much more slowly through the vent due to the restriction the thickness of the vent presents to the foam.

As described hereinafter, the size of the vents is selected such that the gases in the mold may flow through the vents in a relatively unhindered manner while the viscosity of liquid foamable polymeric composition, when it reaches the vent, is such that it flows into and through the vents in a very slow manner, at best. Provided that the vent sizes are properly selected, the liquid foamable polymeric composition will have cured before it has flowed a significant distance into the vent.

As will be apparent to those of skill in the art, vents in accordance with the present invention thus reduce the amount of excess liquid foamable polymeric composition which must be dispensed in the mold to offset the material extruded into the vents.

FIGS. 3, 4, 5 and 6 illustrate a first embodiment of an improved vent assembly 98 in accordance with the present invention which is preferred for use in an upper mold. The vent assembly comprises a mold sleeve 100 with a guide bushing 125 with a cylindrical bore 104 therethrough. A relief pin 108 is located within and engages the inner surface of bore 104. Relief pin 108 is octagonal in cross-section, as best seen in FIG. 4, and when located within guide bushing 125 defines eight vent passages 112 which are segment shaped (i.e. which are shaped as portions cut from a geometric figure (e.g. a circle) by one or more points, lines, or planes).

The upstream end 120 of relief pin 108 which communicates with the cavity of a mold is preferably tapered and the downstream end includes a narrowed throat 124. As shown in FIG. 3, when relief pin 108 is in the venting position, the downstream end of vent passages 112 are in communication with vent chamber 127 which is in turn in communication with vent outlets 128. Vent outlets 128 exhaust gases to the environment outside the mold. In the operating position shown in FIG. 3, gases to be vented from a mold cavity travel along vent passages 112 to vent chamber 127 and then exit through vent outlets 128.

The dimensions of vent passages 112 are selected to allow gases to relatively freely exit cavity 202 and to restrict movement of foam within vent passages 112. Specifically, due to the relatively high viscosity of the foam, the thickness 116 of vent passages 112 present a restriction to the foam while not restricting the gases. Provided that thickness 116 is properly selected, the width 119 of vent passage 112 is not particularly limited, nor is the shape of the passage 112.

As will be apparent to those of skill in the art, the diameter of cylindrical bore 104 and cross-sectional shape of relief pin 108 may be varied to provide different total vent areas while maintaining the desired vent thickness. For example, relief pins with between four and eight sides, defining a like number of vent passages, have been successfully tested.

For polyurethane foams, it has been found that a vent passage thickness of less than about 0.010 inches present a suitable restriction. It will be understood by those of skill in the art that the thickness of the vent passage(s) may be varied according to the particular liquid foamable polymeric composition being used. Thus, if a polymer other than polyurethane is being foamed, the thickness may be suitably determined as would be apparent to those of skill in the art through empirical calculations and/or testing.

While vent assembly 98 has been found to be very successful at limiting foam extrusion from the mold, a small amount of foam does enter vent passages 112. Thus, it is necessary to clean vent passages 112 prior to re-use of the mold. Accordingly, the downstream end of relief pin 108 is connected to a piston 136 in a pneumatic cylinder 140. By varying the pressure on either side of piston 136 through apertures 148 or 152, the end of relief pin 108 may be extended or retracted within bore 104. As relief pin 108 is extended from vent bore 104, the downstream edge of throat 124 sweeps the interior of vent bore 104, removing residual extruded foam. As will be understood by those of skill in the art, guide bushing 125 may be fabricated from Delrin or any other suitable material. FIG. 5 illustrates relief pin 108 in its extended position and FIG. 3 illustrates relief pin 108 in its operating position.

Figure 6:
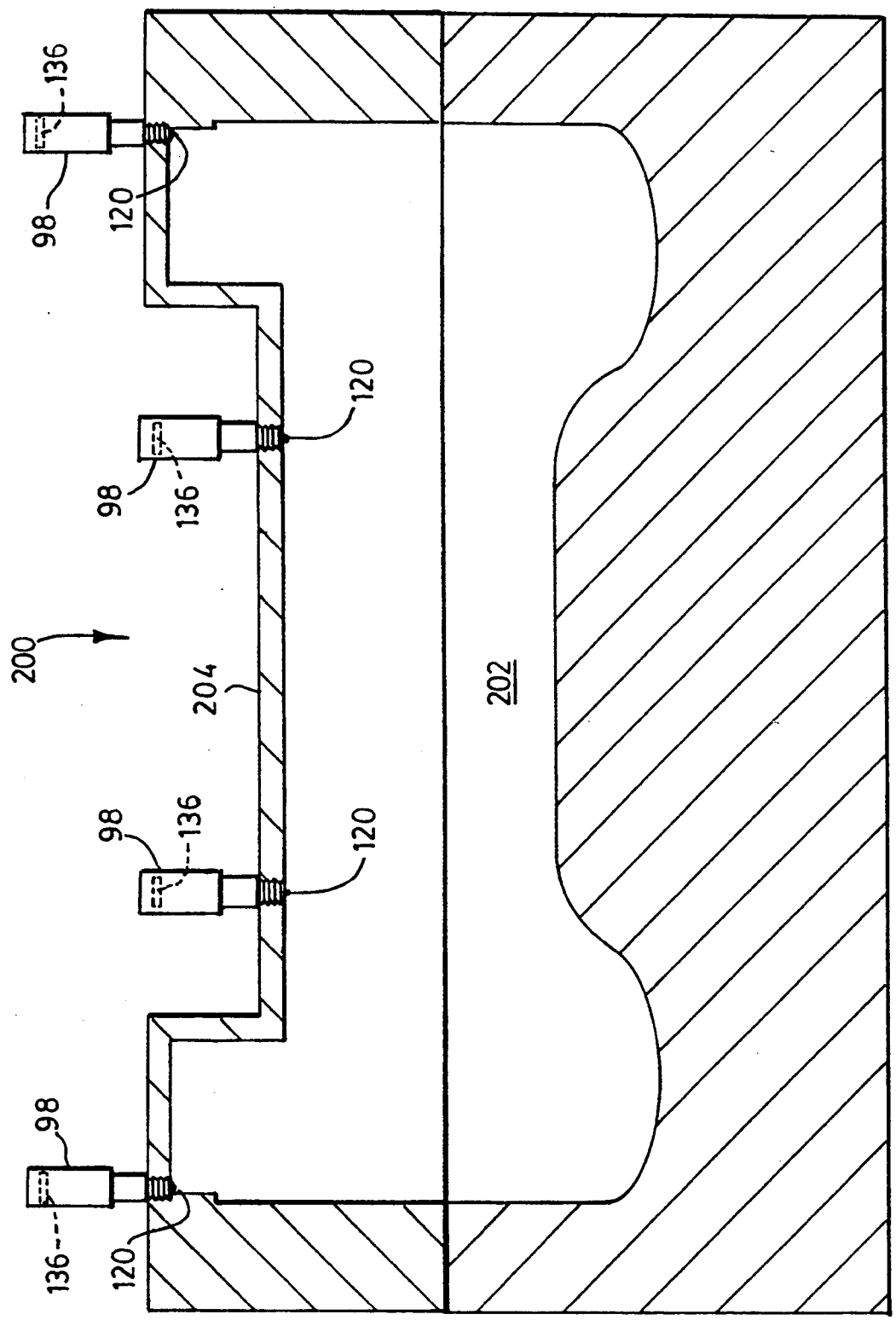
FIG. 6 illustrates a cross-section of a clam-shell mold employing the vent assemblies shown in FIG. 3.

FIG. 6 illustrates a mold 200 which includes several vent assemblies 98. Preferably, vent assemblies 98 are installed in an upper mold 204 of mold 200 in locations strategically selected to provide the desired degree of venting. In use, gases are vented from the vent assemblies 98, as described above, until the foam within cavity 208 reaches the entrance to the vent. At this point, as the foam begins to enter vent passages 112, the restriction presented by vent passages 112 on the foam slows the flow of foam into vent passages 112 such that the foam will have cured before it has entered vent passage to a significant degree, and such that the foam does not exit the vent.

The above-mentioned embodiment provides an advantage over the prior art in that it reduces the amount of excess liquid foamable polymeric composition required to accommodate the foam extruded into the mold vents. Accordingly, the amount of material which enters vent assemblies 98 is reduced when compared to that obtained from conventional mold vents. This results in materials savings and may also results in labour savings since this material need not always be removed from the article or the mold.

Figure 8:
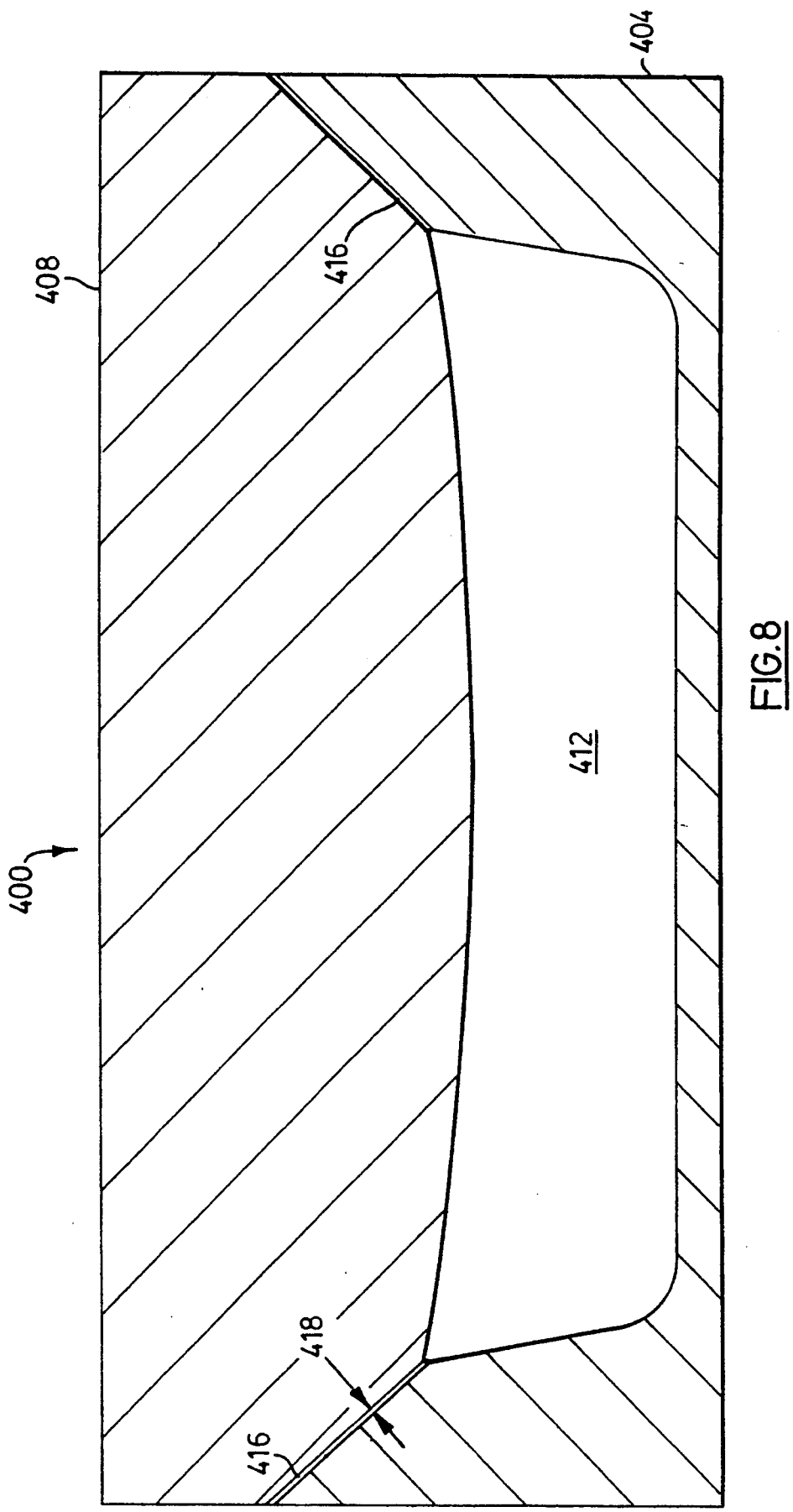
FIG. 8 illustrates a section taken along line 8—8 when the mold of FIG. 7 is closed.

Another embodiment of the present invention, will now be described with reference to FIGS. 7, 8 and 9 which is particularly preferred for use in the part-line between the upper and lower molds. A clam-shell mold is indicated generally at 400 in FIG. 7. The mold includes a lower mold 404 and an upper mold 408 which define a mold cavity 412. The mold includes a series of ribbon vents 416 in accordance with the present invention. As shown in FIG. 8, when mold 400 is closed, ribbon vents 416 extend between mold cavity 412 and the exterior of mold 400. It has been found that ribbon vents with a thickness indicated at 418, of about 0.005 inches to about 0.015 inches are particularly suited for use when molding polyurethane foams. As with vent passages 112 of the previous embodiment, when used with other polymeric foamable compositions, thickness 418 may be altered as required.

The width, indicated at 417, of ribbon vents 416 is not particularly limited. Widths of up to about 6.0 inches have been found to work in a satisfactory manner. In practice, it is contemplated that the limits to vent width 417 will primarily relate to physical limitations imposed by the shape of the article being molded and the requirement to provide an adequate total venting area to cavity 412.

In use, liquid foamable polyurethane composition is dispensed into mold cavity 412, and upper mold 408 and lower mold 404 are sealingly engaged. The air in mold cavity 412 and the gases produced by the chemical reaction occurring in the expanding composition are vented through ribbon vents 416. The viscosity of these gases are such that they flow relatively easily through ribbon vents 416. Once the level of foam in mold 400 reaches the entrance to ribbon vents 416, the foam enters ribbon vents 416. Due to the above-mentioned restriction, which is presented to the expanding composition by vent 416, the expanding composition can only move slowly through ribbon vents 416. Provided that the thickness of ribbon vents 416 has been properly selected, the liquid foamable polymeric composition will stop moving therein before it travels a significant distance along the vents and certainly before it reaches the end of ribbon vents 416.

Figure 9:
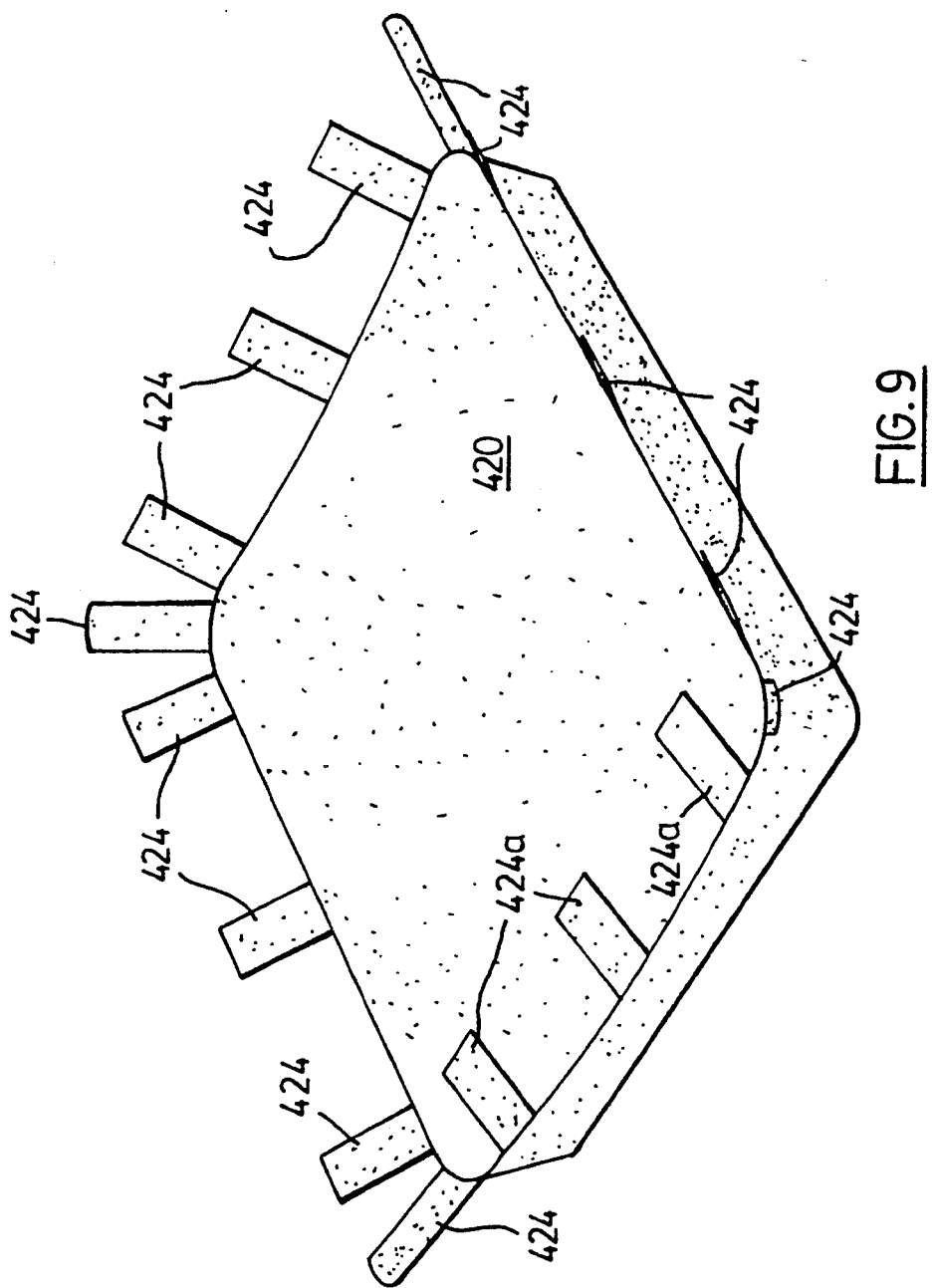
FIG. 9 illustrates a molded article made in the mold shown in FIG. 7.

FIG. 9 illustrates an article 420 fabricated in the mold of FIG. 7 employing ribbon vents 416 in accordance with the present invention. As illustrated, article 420 includes a number of ribbons 424 of extruded material from ribbon vents 416.

The advantages provided by ribbon vents 416 are many. First, the amount of material extruded into ribbon vents 416 is limited due to the restriction presented by thickness 418 to the foam, thus the amount of raw material wasted is reduced with a resultant economic saving. Second, ribbon vents 416 are relatively inexpensive to manufacture compared to the prior art vents. Third, ribbon vents 416 may be added readily at regular spaced intervals about mold cavity 412, limited only by the shape of cavity 412, doing away with much of the iterative design effort on behalf of the mold designer and production engineers which was previously required. Fourth, ribbon vents 416 are easy to clean and in many circumstances are self-cleaning with ribbons 424 being removed from vents 416 when the article 420 produced is removed. Fifth, ribbons 424 of extruded material produced by the ribbon vents 424 have a preferred, 'friendly' shape. Specifically, when ribbon vents 416 with relatively small thickness 418 are employed, the resulting ribbons 424 of extruded material may simply be folded back against article 420 when the finish cover is applied to it while maintaining an acceptable appearance and texture. An example of such folded back ribbons is indicated at 424a. This obviates the need to remove the ribbons 424 of extruded material and results in a labour savings.

In some circumstances, it is contemplated that it may be desirable to sandblast or otherwise roughen the inner surfaces of ribbon vents 416 to further decrease the rate at which the liquid foamable polymeric composition moves through the vent. Also, it is contemplated that in some circumstances ribbon vents with a thickness of less than 0.002 inches may be employed and that such vents will inhibit substantially all foam extrusion into the vent. In this manner, the vent acts as a differential vent allowing passage of gas but inhibiting passage of foam. However, care must be taken when using such differential vents to ensure that an adequate total venting area is still provided to avoid defects in the molded article.

Figure 10:
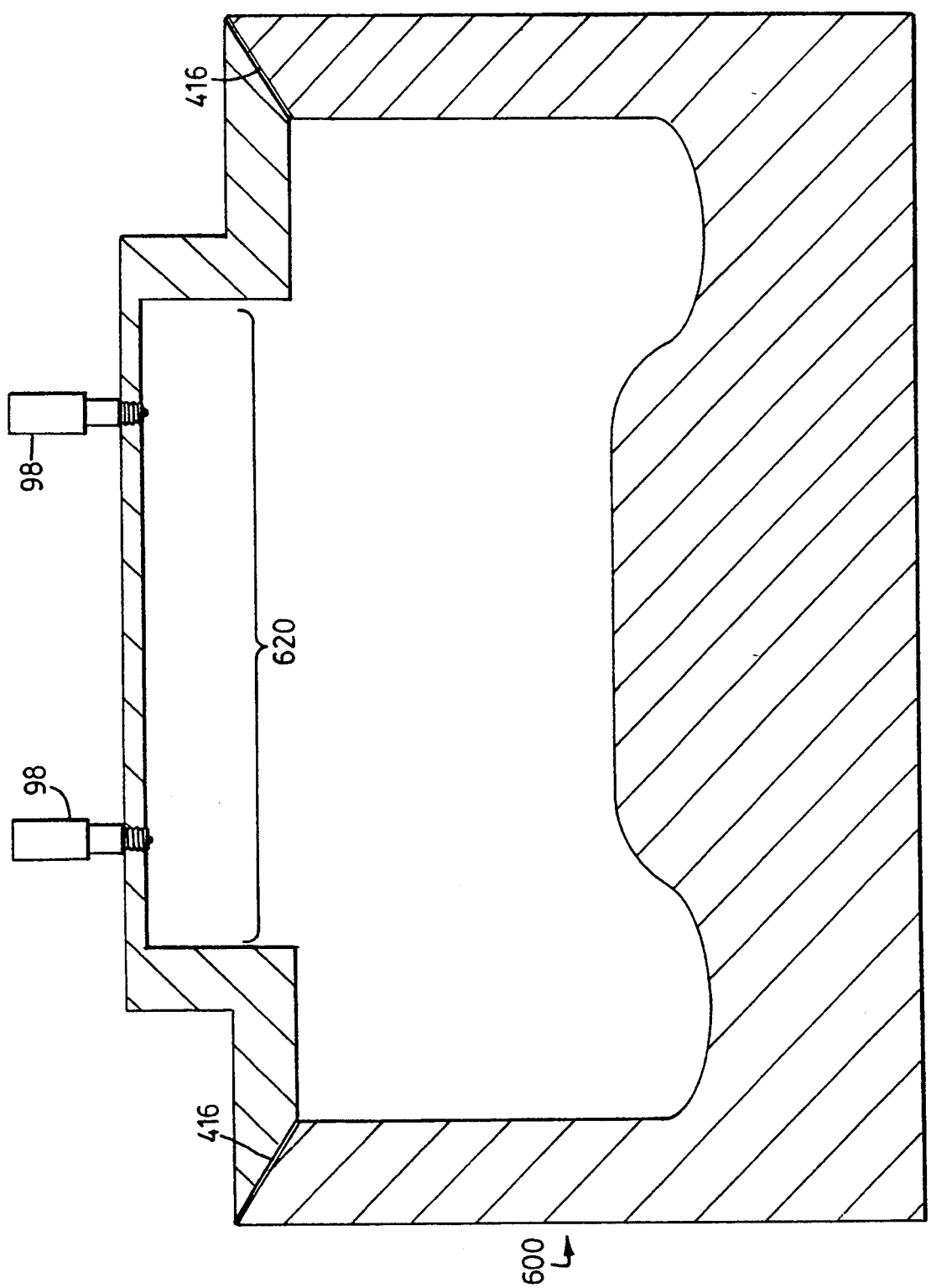
FIG. 10 illustrates a cross-section of a mold employing the vent assemblies shown in FIG. 3 and the vents shown in FIG. 7.

It is contemplated that in many circumstances, it will be desired to employ both of the above-described embodiments in a single mold. Specifically, as shown in FIG. 10, a mold 600 may include one or more otherwise isolated regions 620 at which vent assemblies 98 may preferably be employed, while ribbon vents 416 are preferably employed at the part-line of the mold. Due to their isolation from ribbon vents 416 at the part-line of the mold, vent assemblies 98 are employed to ensure that gases which would otherwise be trapped in regions 620 are properly vented. The design of such a mold, will be clearly understood by those of skill in the art, in view of the description above.

As will also be understood by those of skill in the art, further variations are possible without departing from the spirit of the invention disclosed herein.

What is claimed is:

1. A method of producing an article in a mold comprising an upper mold and a lower mold defining a mold cavity, the process comprising the steps of:
dispensing a liquid foamable polymeric composition into the mold cavity;

allowing the liquid foamable polymeric composition to expand to substantially fill the mold cavity;

venting gases in the mold cavity through at least one vent in the mold to allow the gases to exit from the mold, the vent comprising a passageway between an interior of the mold and an exterior of the mold;

selecting the size of each vent such that movement of the liquid foamable polymeric composition in the vent is restricted;

at least partially curing the liquid foamable polymeric composition in the vent, slowing the movement of the composition therein;

preventing the liquid foamable polymeric composition from exiting from the vent; and wherein the size of each vent is also selected such that the at least partially cured polymeric composition, which is extruded into said vent passageway: (i) does not exit the vent passageway to the exterior of the mold, and (ii) is a ribbon of foam material which, when folded back against said article, may be covered with a cover material to produce a covered article of acceptable appearance and texture without the need to remove said ribbon from said article.

2. The method of claim 1 wherein said at least one vent is located at the part-line between said upper mold and said lower mold.

3. The method of claim 2 wherein the size of each vent comprises a thickness of from about 0.002 inches to about 0.030 inches.

4. The method of claim 2 wherein the size of each vent comprises a thickness of from about 0.005 inches to about 0.020 inches.

5. The method of claim 1, further comprising the step of venting gases from the mold cavity through a differential vent having a thickness of less than about 0.002 of an inch to inhibit substantially entry of said liquid foamable polymeric composition into said vent.

6. The method of claim 2 wherein each vent is substantially rectangular in cross-section and said liquid foamable polymeric composition entering said vent results in a ribbon of polymeric material attached to said article.

7. The method of claim 6 further comprising the steps of folding back said ribbon of polymeric material against said article and applying a finish cover to said article so that said ribbon is folded flat between said article and said finish cover.

8. The method of claim 3 wherein each vent is substantially rectangular in cross-section and said liquid foamable polymeric composition entering said vent results in a ribbon of polymeric material attached to said article.

9. The method of claim 8 further comprising the steps of folding back said ribbon of polymeric material against said article and applying a finish cover to said article so that said ribbon is folded flat between said article and said finish cover.

10. A method according to claim 1, wherein said selecting step includes the step of selecting a plurality of substantially rectangular cross-shaped vents, and wherein said liquid foamable polymeric composition forms a plurality of ribbons of polymeric material attached to said article.

11. A method of producing an article in a mold comprising an upper mold and a lower mold defining a mold cavity, the process comprising the steps of:

dispensing a liquid foamable polymeric composition into the mold cavity;

allowing the liquid foamable polymeric composition to expand to substantially fill the mold cavity;

venting gases in the mold cavity through at least one vent in the mold to allow the gases to exist from the mold, the size of each vent being selected such that movement of the liquid foamable polymeric composition into the vent is restricted to substantially prevent exist thereof from the vent, said liquid foamable polymeric material entering into said vent forming a ribbon of polymeric material attached to said article; and folding back said ribbon of polymeric material against said article and applying a finish cover to said article so that said ribbon is folded flat between said article and said finish cover.

12. A method of producing an article in a mold comprising an upper mold and a lower mold defining a mold cavity, the process comprising the steps of:

dispensing a liquid foamable polymeric composition into the mold cavity;

allowing the liquid foamable polymeric composition to expand to substantially fill the mold cavity;

venting gases in the mold cavity through at least one vent in the mold to allow gases to exit from the mold; and selecting the size of said at least one vent such that movement of the liquid foamable polymeric composition in the vent is restricted, and such that said vent extends between an interior of the mold an exterior of the mold;

at least partially curing the liquid foamable polymeric composition in the vent, slowing the movement of the composition therein;

causing the liquid foamable polymeric composition to enter the vent and preventing the liquid foamable polymeric composition from exiting from the vent to the exterior of the mold, wherein the size of each vent is also selected (i) such that the at least partially cured polymeric composition, which is extruded into said vent, does not exit from the vent to the exterior of the mold, and (ii) such that the polymeric composition which cures within said vent forms a flexible extrusion capable of being folded back against said article when a finished cover is applied over both said article and said folded-back flexible extrusion, such that a covered article may be produced without the necessity of removing said flexible extrusion from said article.

13. The method of claim 12, wherein said at least one vent is located at the part-line between said upper mold and said lower mold.

14. The method of claim 13, wherein the size of each vent comprises a thickness of from about 0.002 inches to about 0.030 inches.

15. The method of claim 13, wherein the size of each vent comprises a thickness of from about 0.005 inches to about 0.020 inches.

16. The method of claim 12, further comprising the step of venting gases from the mold cavity through a differential vent having a thickness of less than about 0.002 of an inch to inhibit substantially entry of said liquid foamable polymeric composition into said vent.

17. The method of claim 13, wherein each vent is substantially rectangular in cross-section and said liquid foamable polymeric composition entering said vent results in a ribbon of polymeric material attached to said article.

18. The method of claim 17, further comprising the steps of folding back said ribbon of polymeric material against said article and applying a finish cover to said article so that said ribbon is folded flat between said article and said finish cover.

19. The method of claim 14, wherein each vent is substantially rectangular in cross-section and said liquid foamable polymeric composition entering said vent results in a ribbon of polymeric material attached to said article.

20. The method of claim 19, further comprising the steps of folding back said ribbon of polymeric material against said article and applying a finished cover to said article so that said ribbon is folded flat between said article and said finish cover.

21. A method of producing an article in a mold comprising an upper mold and a lower mold defining a mold cavity, the process comprising the steps of:
dispensing a liquid foamable polymeric composition into the mold cavity;
allowing the liquid foamable polymeric composition to expand to substantially fill the mold cavity;
venting gases in the mold cavity through at least one vent in the mold to allow gases to exit from the mold;
selecting a vent having a passageway and an obstruction in said passageway, said obstruction and said passageway combining to form an opening having a shape which causes movement of the liquid foamable polymeric composition in the vent to be restricted, said vent passageway extending between an interior of the mold and an exterior of the mold;
at least partially curing the liquid foamable polymeric composition in the vent, slowing the movement of the composition therein;
preventing the liquid foamable polymeric composition from exiting from the vent,
wherein the size of each is also selected such that the at least partially cured polymeric composition, which is extruded into said vent passageway, does not exit from the vent passageway to the exterior of the mold; and
moving said obstruction axially inside said passageway to expel the at least partially cured liquid foamable polymeric composition from the vent passageway.

22. The method of claim 21 wherein said at least one vent is located in said upper mold.

23. The method of claim 22 wherein each vent is segmental in cross-section.

24. The method of claim 22 wherein the size of each vent comprises a thickness of from about 0.002 inches to about 0.015 inches.

25. The method of claim 22 wherein the size of each vent comprises a thickness of from about 0.003 inches to about 0.010 inches.

26. A method according to claim 21, wherein said selecting step comprises the step of selecting a vent having a passageway and an obstruction in said passageway, said obstruction and said passageway combining to form an opening having a shape which causes the movement of the liquid foamable polymeric composition in the vent to be restricted.

27. A method according to claim 21, wherein said selecting step includes the step of selecting a passageway and an obstruction combining to form a plurality of openings between the obstruction and a wall of said passageway to cause the liquid foamable polymeric composition to move through said openings.

28. A method according to claim 27, wherein said venting step includes the step of venting the gases through a port which is in communication with said plurality of openings.

* * * * *